US007769780B2

(12) United States Patent
Kashiwagi et al.

(10) Patent No.: US 7,769,780 B2
(45) Date of Patent: Aug. 3, 2010

(54) INFORMATION PROCESSING APPARATUS, INFORMATION PROCESSING METHOD, COMPUTER READABLE MEDIUM, AND COMPUTER DATA SIGNAL

(75) Inventors: Takaaki Kashiwagi, Kanagawa (JP); Akifumi Sekijima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 283 days.

(21) Appl. No.: 11/639,236

(22) Filed: Dec. 15, 2006

(65) Prior Publication Data

US 2007/0282890 A1 Dec. 6, 2007

(30) Foreign Application Priority Data

May 31, 2006 (JP) .............................. 2006-151040

(51) Int. Cl.
*G06F 17/30* (2006.01)
(52) U.S. Cl. ....................................... 707/783; 707/784
(58) Field of Classification Search .................. 707/783, 707/784
See application file for complete search history.

(56) References Cited

U.S. PATENT DOCUMENTS

| 5,276,901 | A | * | 1/1994 | Howell et al. ........................ 1/1 |
| 5,649,185 | A | * | 7/1997 | Antognini et al. ................... 1/1 |
| 6,480,850 | B1 | * | 11/2002 | Veldhuisen .......................... 1/1 |
| 6,493,717 | B1 | * | 12/2002 | Junkin ............................... 1/1 |
| 6,578,037 | B1 | * | 6/2003 | Wong et al. ......................... 1/1 |
| 6,581,060 | B1 | * | 6/2003 | Choy ................................. 1/1 |
| 6,631,371 | B1 | * | 10/2003 | Lei et al. ............................ 1/1 |
| 6,662,181 | B1 | * | 12/2003 | Icken et al. ......................... 1/1 |
| 6,671,695 | B2 | * | 12/2003 | McFadden ........................... 1/1 |
| 6,697,821 | B2 | * | 2/2004 | Ziff et al. ............................. 1/1 |
| 6,725,229 | B2 | * | 4/2004 | Majewski et al. .................... 1/1 |
| 6,928,425 | B2 | * | 8/2005 | Grefenstette et al. ................ 1/1 |
| 7,415,664 | B2 | * | 8/2008 | Aureglia et al. ............. 715/212 |
| 2002/0007380 | A1 | * | 1/2002 | Bauchot et al. ............. 707/530 |
| 2005/0015379 | A1 | * | 1/2005 | Aureglia et al. ............. 707/100 |
| 2007/0214497 | A1 | * | 9/2007 | Montgomery et al. .......... 726/4 |
| 2009/0138387 | A1 | * | 5/2009 | Boyle et al. .................. 705/30 |
| 2009/0183251 | A1 | * | 7/2009 | Deinlein et al. ............... 726/12 |

FOREIGN PATENT DOCUMENTS

JP 7-110763 A 4/1995

* cited by examiner

*Primary Examiner*—Don Wong
*Assistant Examiner*—Kim T Nguyen
(74) *Attorney, Agent, or Firm*—Sughrue Mion, PLLC

(57) ABSTRACT

An information processing apparatus that configures an operation screen formed by one or more user interface components in which a parameter value is a base of displaying the user component, the apparatus includes: a meta-information storage that stores meta-information in which a user having a privilege to change a parameter value and an influence range which is under influence of the changed parameter are stored; a parameter storage that stores a parameter value set by a user; a parameter change section that changes the parameter value stored in the parameter storage in accordance with a request from a user; and an operation screen configuration section that configures the operation screen to display by specifying the influence range based on the meta-information of each parameter contained in the user interface component, and acquiring the parameter value from the parameter storage.

17 Claims, 7 Drawing Sheets

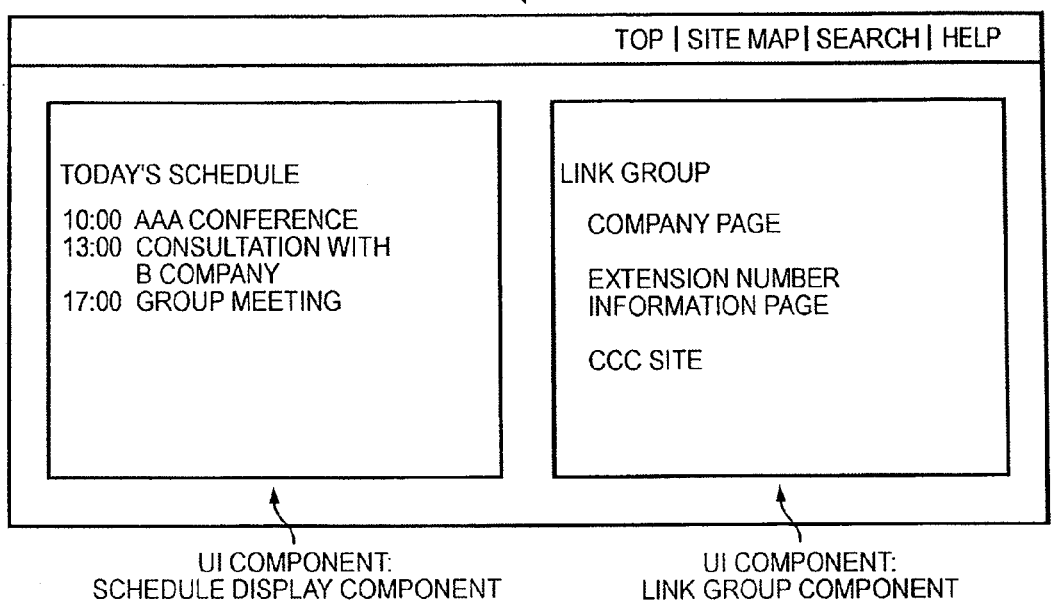

FIG. 8

CHANGE OF NAVIGATION BAR

SELECT ITEMS TO BE DISPLAYED IN THE NAVIGATION BAR

☒ TOP

☒ SITEMAP

☐ SEARCH

☒ HELP

APPLY    CANCEL

US 7,769,780 B2

INFORMATION PROCESSING APPARATUS, INFORMATION PROCESSING METHOD, COMPUTER READABLE MEDIUM, AND COMPUTER DATA SIGNAL

BACKGROUND

1. Technical Field

The present invention relates to an information processing apparatus, an information processing method, a computer program, and computer data signal for presenting information on a GUI (Graphical User Interface) screen providing a graphics-based operating environment. Particularly it relates to an information processing apparatus, an information processing method and a computer program in which a user can customize a GUI screen.

More specifically, the present invention relates to an information processing apparatus, an information processing method and a computer program in which a user can customize the configuration of a UI screen by using UI components. Particularly it relates to an information processing apparatus, an information processing method and a computer program in which the contents of customization allowable to a user and the range of influence of customization can be controlled in accordance with UI components and an operating environment.

2. Related Art

Various types of computers have been developed and produced with the recent rapid advance of the information technology (IT) field, so that computers have become widespread in universities and other research organizations, offices in enterprises and general homes. A GUI (Graphical User Interface) supporting a bitmapped display format and providing a graphics-based operating environment is incorporated in most of computers, so that a user's intuitive entry operation through a mouse cursor is used widely and commonly. For example, U.S. Apple's Macintosh, U.S. Microsoft's Windows (registered trademark), etc. are known widely as the GUI-based environment.

In the latest computer provided with a GUI, a user can configure the UI screen. For example, in Cybozu's groupware "Office", a user can customize the UI screen in a portion unrelated to processing in the inside of the system so that the arrangement and colors of UI components constructing the screen can be changed.

SUMMARY

According to an aspect of the present invention, an information processing apparatus that configures an operation screen formed by one or more user interface components in which a parameter value is a base of displaying the user component, the apparatus includes: a meta-information storage that stores meta-information in which a user having a privilege to change a parameter value and an influence range which is under influence of the changed parameter are stored; a parameter storage that stores a parameter value set by a user; a parameter change section that changes the parameter value stored in the parameter storage in accordance with a request from a user; and an operation screen configuration section that configures the operation screen to display by specifying the influence range based on the meta-information of each parameter contained in the user interface component, and acquiring the parameter value from the parameter storage.

BRIEF DESCRIPTION OF THE DRAWINGS

Exemplary embodiment of the present invention will be described in detail based on the following figures, wherein:

FIG. 2 is a view showing an example of configuration of a UI screen formed from UI components;

FIG. 3 is a view showing an example of configuration of a UI component which holds a plurality of parameters;

FIG. 8 is a view showing an example of configuration of a screen for changing a navigation bar;

DETAILED DESCRIPTION

An embodiment of the invention will be described below in detail with reference to the drawings.

Figure 1:
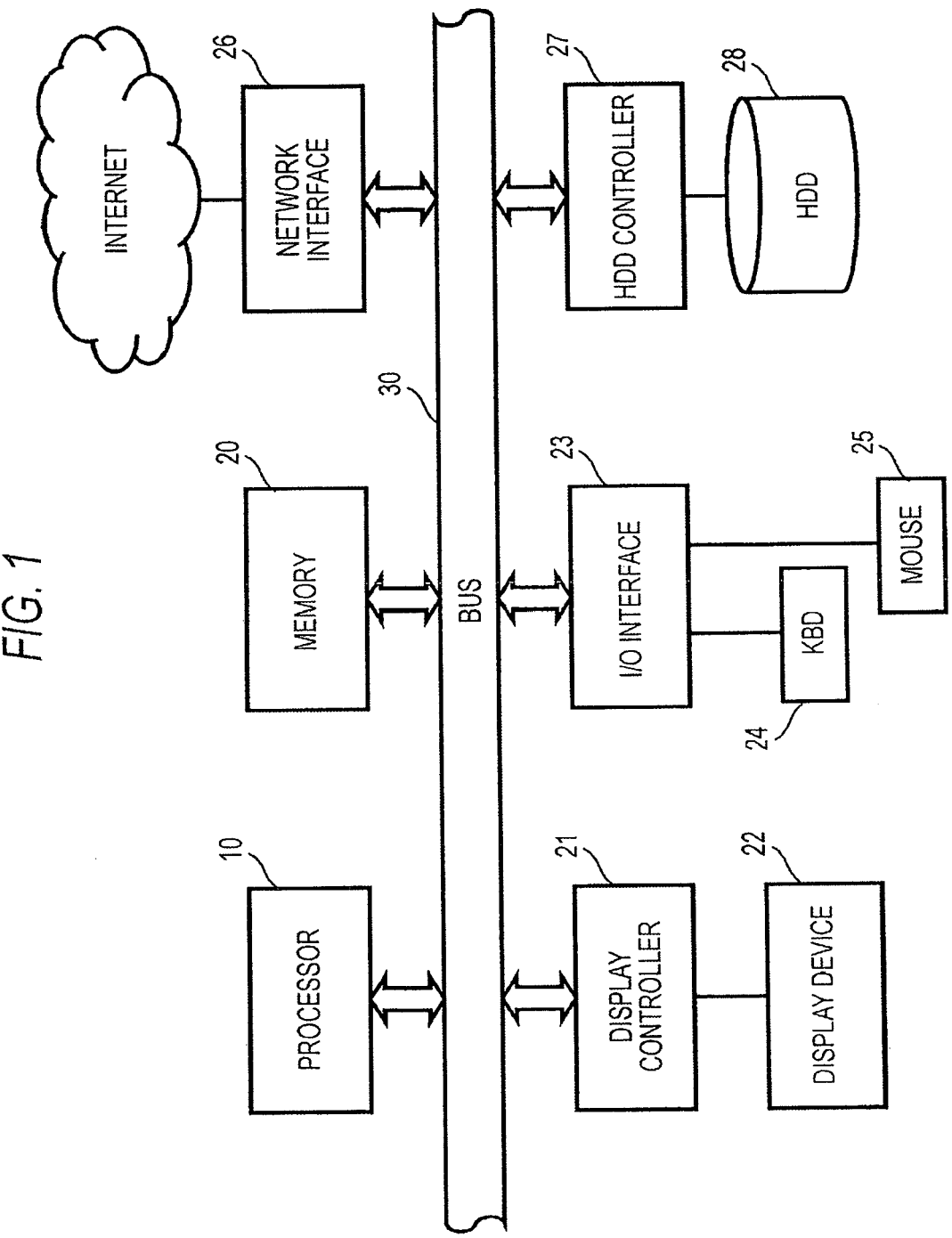
FIG. 1 is a diagram typically showing the hardware configuration of an information processing apparatus in which a user can appropriately customize the configuration of a UI screen by using UI components.

FIG. 1 typically shows the hardware configuration of an information processing apparatus in which each user can appropriately customize the configuration of a UI screen by using UI components. The information processing apparatus can be formed from a general-purpose computer system such as a personal computer (PC).

The information processing apparatus includes a processor 10 as its center. The processor 10 executes various processes on the basis of programs stored in a memory under a program execution environment provided by an operating system (OS). Assume that the OS supports a bitmapped display format and provides a GUI operating environment.

The processor 10 controls various connected peripheral apparatuses through a bus 30. The peripheral apparatuses connected to the bus 30 are as follows.

For example, a memory 20 is made of a semiconductor memory such as a DRAM (Dynamic RAM). The memory 20 is used for loading program codes executed by the processor 10 and temporarily storing environment variables and system variables in execution of a program. The memory 20 forms a memory space for the processor 10.

A display controller 21 generates a display image in accordance with a drawing instruction given from the processor 10 and sends the display image to a display device 22. The display device 22 connected to the display controller 21 outputs the image to a screen in accordance with display image information given from the display controller 21.

A keyboard 24 and a mouse 25 are connected to an input/output interface (I/O interface) 23. The I/O interface 23 transfers an input signal from the keyboard 24 or the mouse 25 to the processor 10.

A network interface 26 is connected to an external network such as an LAN or the Internet. The network interface 26 controls data communication through the Internet. That is, the network interface 26 transfers data given from the processor 10 to another apparatus on the Internet and receives data given through the Internet and sends the data to the processor 10. For example, the network interface 26 can receive programs and data from the outside through the network.

A hard disk drive (HDD) controller 27 controls I/O of data to/from an HDD 28. Programs of an operating system (OS), application programs and driver programs to be executed by the processor and data or contents to be referred to or reproduced by the programs are stored in the HDD 28. In this embodiment, each program is installed in an executable format on the HDD 28.

Incidentally, a lot of electric circuits other than those shown in FIG. 1 are required for forming the information processing apparatus. The other electric circuits will be not described in this specification because they are well-known to those skilled in the art and they do not form the gist of the invention. Please note that only part of connections between respective hardware blocks is shown in the drawings in order to avoid complexity of the drawings.

A method of customizing the UI screen will be described next.

Assume that the UI screen used in this embodiment is formed from one or more independent UI components. The UI component mentioned here is basically configured from combination of the name of each parameter and the value of the parameter, so that the UI component has a mechanism that display is decided by the value of the parameter. One UI component holds zero or more parameters. That is, one UI component may have a plurality of parameters. Some UI component embedded in the UI screen may be formed from information for reference to an external UI component.

FIG. 2 shows an example of the UI screen formed from UI components. UI components having parameter names "navigation component", "schedule display component" and "link group component" are arranged on the screen shown in FIG. 2.

FIG. 3 shows an example of configuration of a UI component having a plurality of parameters. The UI component shown in FIG. 3 is called "object list display component" which is used for displaying a list of objects. The UI component is formed from a parameter "columns" for deciding what to be displayed on each column and a parameter "color" for deciding the color of the UI component. In FIG. 3, "title", "create date" and "owner" are provided as values of the parameter "columns" and "white" is provided as a value of the parameter "color". Each user can customize the color of the list display component by changing the value of the parameter "color" for deciding the color.

The UI screen or each of UI components contained in the UI screen is formed from zero or more parameters. Each user can designate the contents of display by setting values of respective parameters or changing the setting. In addition, meta-information is given in accordance with each parameter in order to make a judgment as to whether each parameter can be set by the user, and define the range of influence of parameter values set by the user. When, for example, the administrator is designated as the privilege of change and all users are designated as the range of influence, only the administrator can change the values of the parameter but the changed contents of the parameter have influence on all users.

Figure 4:
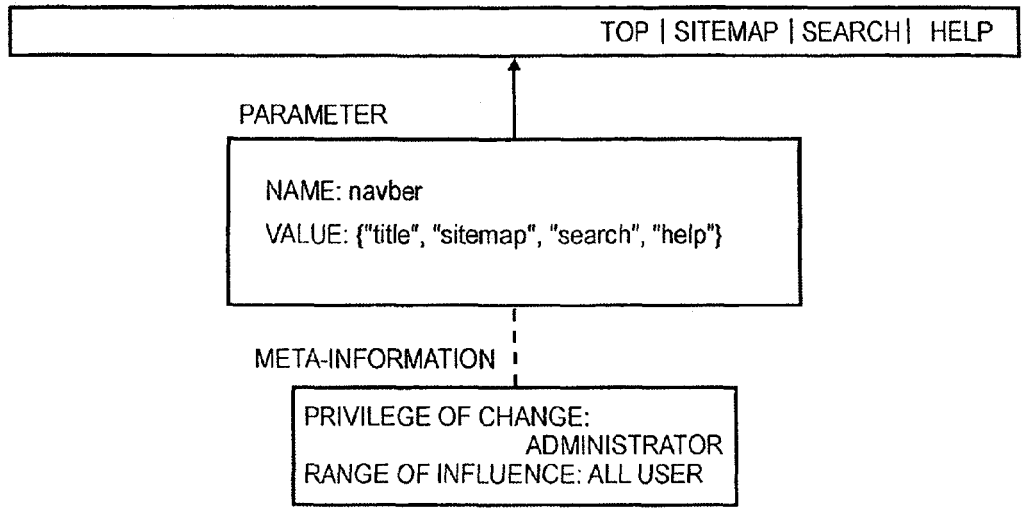
FIG. 4 is a view showing an example of configuration of a page navigation component "navbar" of a Web application.

FIG. 4 shows an example of configuration of a page navigation component "navbar" of a Web application. The page navigation component shown in FIG. 4 has several link items displayed. When a link is clicked, the displayed page can be changed to another page. For example, link items are array type parameters, so that link items to be displayed can be changed when the contents of the array are changed.

This page navigation component is roughly a component common to the whole Web application (i.e. a component unchanged when any user views the component). It is conceived that the user which can customize the page navigation component needs to be limited to the administrator of the Web application. In this case, meta-information is provided so that the user which can change the parameter of the page navigation component is set to the administrator while the range of influence of the change is set to all users.

On the other hand, when the color of a private page needs to be changed, meta-information can be provided so that the privilege of change of the parameter is given to all users and the range of influence of the change is set to a user of the private page.

When the UI of the information processing apparatus has the aforementioned mechanism, a generally accepted value is held as a default value in meta-information of each parameter of a UI component at the stage of development. If necessary, the administrator of the information processing apparatus can change the meta-information of each parameter so that the portion customizable to each user and the range of influence of the contents of customization are set dynamically in the UI screen.

A specific example in which one information processing apparatus is used by a plurality of groups will be considered here.

When one information processing apparatus is used by a plurality of groups, operating forms are not always unified in all the groups. It may be conceived that the user interface needs to be changed in accordance with each group.

In default, meta-information of the UI component is provided so that the privilege of change is given to the administrator of the information processing apparatus and the range of influence of the changed contents is set to all users. When the setting of the meta-information is changed so that the privilege of change is given to the administrator of each group and the range of influence is set to each group, the UI component can be operated uniquely to each group.

Figure 5A:
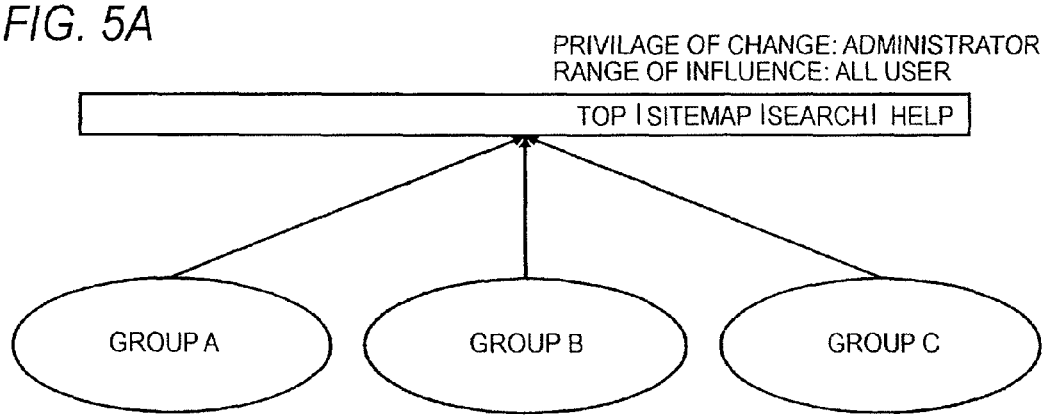
FIG. 5A is a view showing a state in which meta-information is changed in a navigation bar of the information processing apparatus.
Figure 5B:
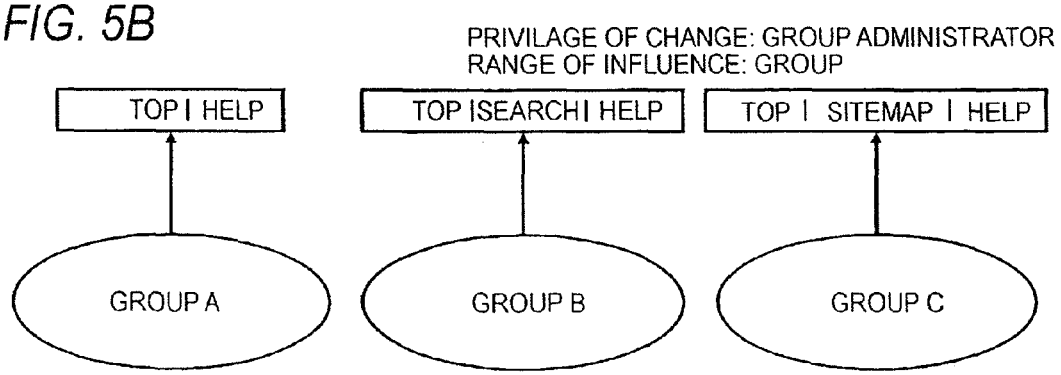
FIG. 5B is a view showing a state in which meta-information is changed in a navigation bar of the information processing apparatus.

FIGS. 5A and 5B graphically show a state in which meta-information is changed with respect to a navigation bar of the information processing apparatus.

The navigation bar is roughly a component common to the whole system. Accordingly, it is proper that only the administrator of the system can customize the navigation bar. In default, meta-information of the UI component is provided so that the privilege of change is given to the administrator and the range of influence of the change is set to all users (see FIG. 5A).

In the aforementioned setting, the navigation bar is displayed in common to all groups. There is a problem that the navigation bar containing a certain item requested to be deleted from the navigation bar by a group A cannot be customized if another group B needs the item. Therefore, when the meta-information is changed so that the privilege of change of the navigation bar is given to the administrator of each group and the range of influence of the changed contents is set to each group, the navigation bar can be customized uniquely to each group. In the example shown in FIG. 5B, items contained in the navigation bar vary in accordance with each group.

Figure 6:
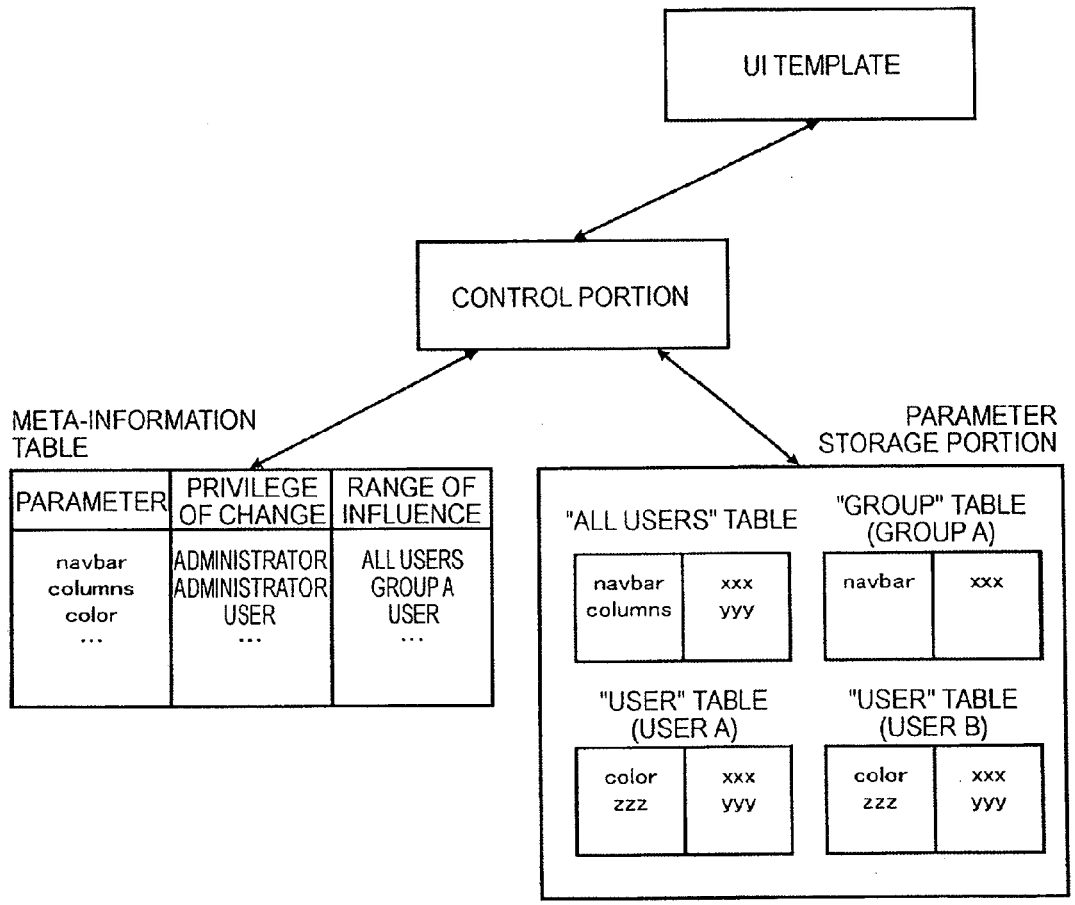
FIG. 6 is a view showing a functional configuration for controlling the contents of customization allowable to a user and the range of influence of customization in accordance with each UI component and each operating environment.

The information processing apparatus according to this embodiment can control the contents of customization allowable to each user and the range of influence of customization in accordance with each UI component and each operating environment by setting the privilege of change and the range of influence of the changed contents as meta-information with respect to each UI component when a UI screen is formed from one or more UI components while each UI component is presented on the basis of a value set in each parameter contained in the UI component. FIG. 6 typically shows a functional configuration to make such control possible.

A UI template is used for generating and editing each of UI components constituting a UI screen. The UI template may be separated into two parts, i.e. one part for deciding the arrangement of UI components and the other part for displaying the UI components per se. An example of notation of a template (a template for displaying the background color) is as follows.

bgcolor="$params.get('color')"

Table entries are provided in a meta-information table in accordance with UI components. Meta-information of each UI component, that is, the privilege of change and the range of influence of customization are registered in the meta-information table.

As a method of changing meta-information, for example, an administrator UI screen (not shown) is prepared and meta-information is set while a UI component or parameter to be changed is selected on the administrator UI screen. A result of the change of meta-information is reflected on the meta-information table.

A parameter storage portion contains parameter tables in accordance with ranges of influence. Parameter values set in UI components by respective users are stored in the parameter tables. An "all users" table is a parameter table for storing parameter values in which the range of influence is set to all users. The administrator of the system can set the "all users" table. A "group" table is a parameter table for storing parameter values in which the range of influence is limited to a group. The administrator of the group can set the "group" table. Each "user" table is a parameter table of user's own for storing values of parameters changed by the user.

For example, assume that different parameter values with respect to a UI component "navbar" are set between all users and a group A in the parameter storage portion. When the meta-information table is provided so that the privilege of change of "navbar" is set to the system administrator and the range of influence is set to all users, a control portion displays "navbar" by referring to the parameter value set in the "all users" table. On the other hand, when the system administrator changes the meta-information so that the privilege of change is given to each group and the range of influence is set to each group, the control portion displays "navbar" by referring to the parameter value set in the group A in order to configure a UI screen of each user in the group A.

As a method of customizing the UI screen, for example, a UI customization setting page (not shown) is prepared for each user and the user selects a parameter to be customized through the screen and sets the value of the parameter. A result of the setting is reflected on the parameter storage portion. When a parameter in which the range of influence is limited to the user per se is changed, the changed parameter value is stored in a corresponding "user" parameter table. When a parameter in which the range of influence is set to all users is changed, the changed parameter value is stored in the "all users" parameter table.

When, for example, the background color of the UI screen is to be changed in FIG. 6, the user changes the value of a parameter "color" through a UI customization setting page (not shown) or the like. Upon reception of a changing request from the user, the control portion acquires the privilege of change of the parameter "color" and the range of influence of the changed contents by referring to the meta-information table. In the example shown in FIG. 6, the parameter "color" is judged to be customizable because the parameter "color" can be changed by all users. Moreover, because the range of influence is set to "user", the parameter table of the user per se in the parameter storage portion is referred to so that the value of the parameter "color" currently stored is changed to a value requested by the user.

Figure 7:
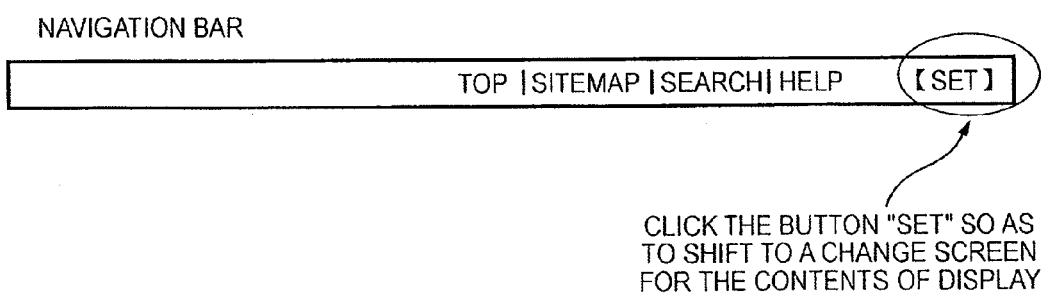
FIG. 7 is a view showing an example of configuration of a careen for changing a parameter.

To customize the UI screen, the user needs to change a parameter defining the look of the UI. FIG. 7 shows an example of configuration of the screen for changing the parameter. In FIG. 7, a button "set" is disposed, as an entry to the change screen, in a UI component "navigation bar". When the button "set" is clicked, the contents of display can be changed to the change screen.

FIG. 8 shows an example of configuration of the screen for changing the navigation bar. Customization buttons (check boxes) for designating the selection of respective items "top", "sitemap", "search" and "help" of the navigation bar prepared by the UI template are presented in the change screen. In the example shown in FIG. 8, items "top", "site map" and "help" have been selected. When a button "apply" is clicked, a value {"top", "sitemap", "help"} of the parameter "navbar" is sent and registered in the meta-information table.

Incidentally, only the user given the privilege of change in the meta-information table can change the parameter value. When a mechanism for displaying a bottom "customize" for only the user having the privilege of change of the parameter is introduced into the change screen shown in FIG. 8, it is convenient for the user. To judge whether the privilege of change of the parameter is given or not, a privilege corresponding to the parameter can be acquired from the meta-information table so that a judgment can be made as to whether the privilege is given to the user in operation or not.

Figure 9:
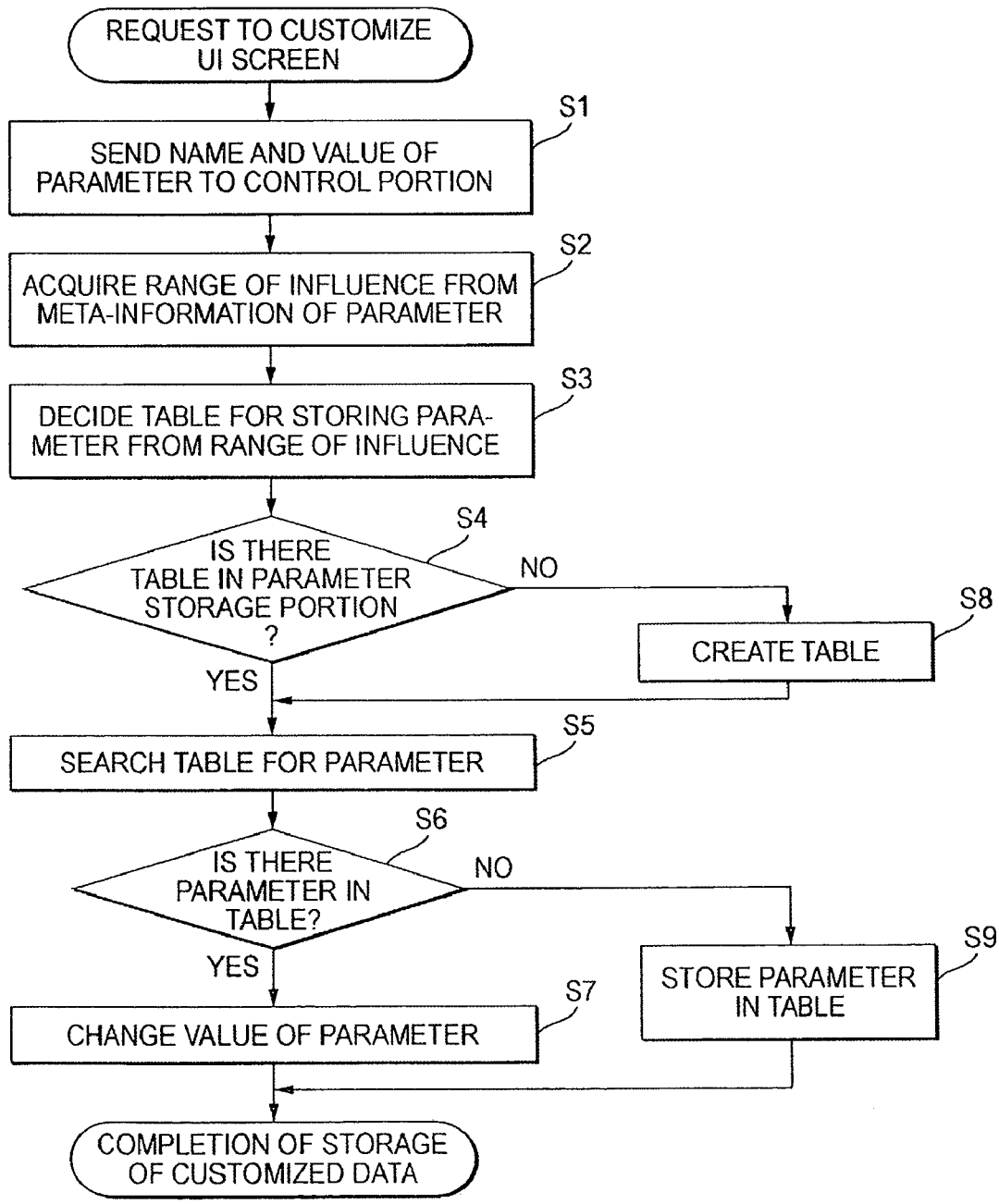
FIG. 9 is a flow chart showing a processing procedure required for a user to change a parameter.

FIG. 9 is a flow chart showing a processing procedure necessary for a user (e.g. user A) to change a parameter.

When there is a request to customize the UI screen, the name and value of the parameter to be changed are first sent to the control portion (step S1).

The control portion searches the meta-information table for the parameter and acquires the range of influence of change of the parameter (step S2).

Then, the control portion decides a parameter table corresponding to the acquired range of influence and searches the parameter storage portion for the table (step S3).

When the parameter table is absent in the parameter storage portion ("No" in step S4), the control portion creates a new parameter table (step S8).

Then, the control portion searches the parameter table for a table entry of the parameter name requested by the user (step S5).

When the table entry is found ("Yes" in step S6), the control portion changes the value of the parameter to a value sent from the user (step S7) and then this processing routine is terminated.

When the table entry is absent in the parameter table ("No" in step S6), the control portion creates a new table entry in the parameter table and writes the name and value of the parameter sent from the user, into this entry (step S9) and then this processing routine is terminated.

Customization of the UI screen can be achieved by the aforementioned procedure.

When there is a screen display request from a user, the control portion searches for a UI template required for display and creates a UI screen in accordance with the UI template. When the parameter name is designated in the template, the control portion acquires meta-information of the parameter designated from the meta-information table, acquires the parameter value from the parameter storage portion on the basis of the range of influence in the meta-information and creates a UI screen.

When, for example, the range of influence is set to "all users", the control portion acquires the parameter from the "all users" table in the parameter storage portion. When, for example, the range of influence is set to "user", the control portion acquires the parameter from the "user" table of the user requesting display.

When the parameter entry is absent in the "user" parameter table because the user has not customized the UI component yet, the control portion may be designed to acquire the parameter from a parameter table wider in the range of influence.

Figure 10:
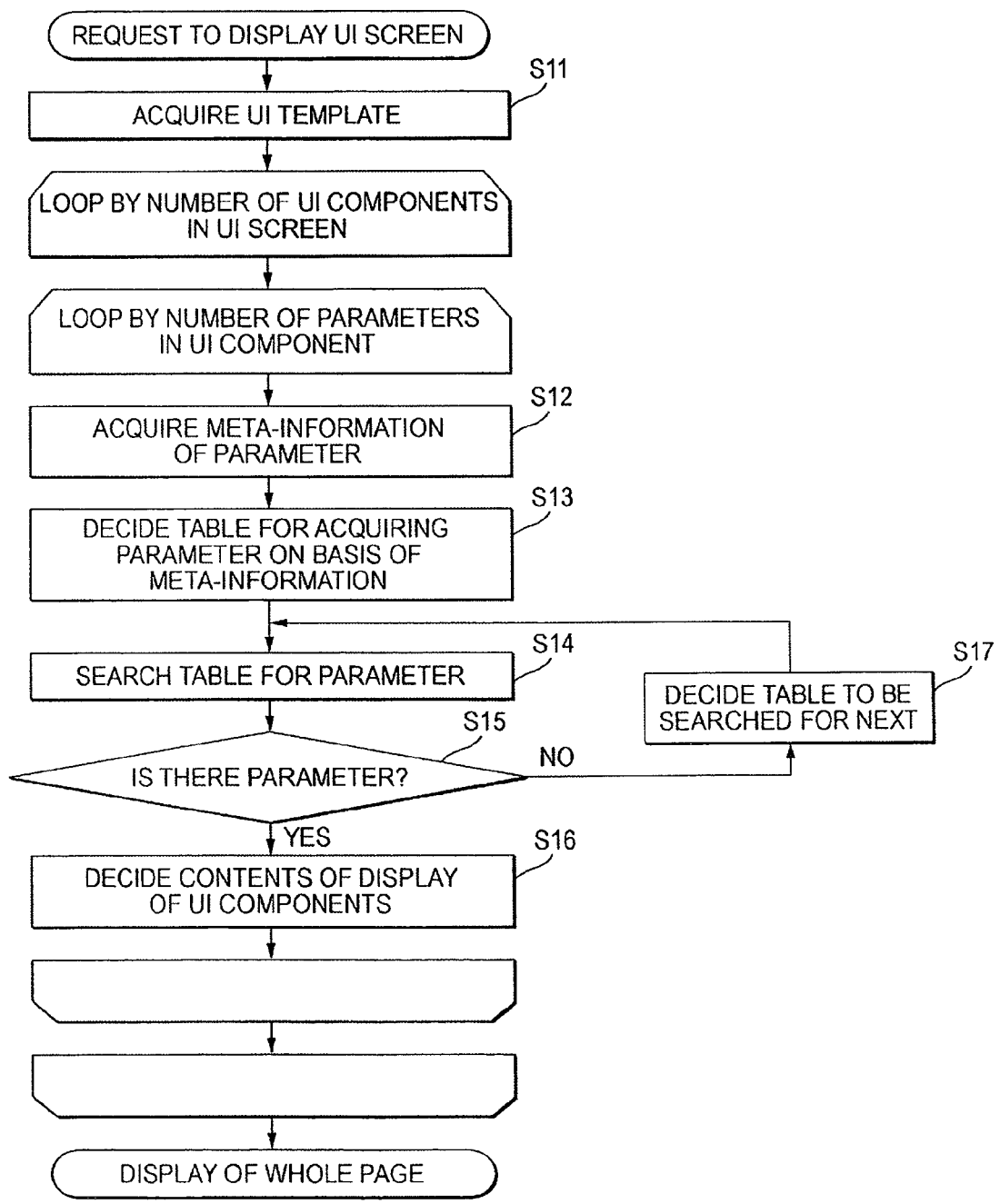
FIG. 10 is a flow chart showing a processing procedure for displaying a UI screen in accordance with a screen display request from a user.

FIG. 10 is a flow chart showing a processing procedure for displaying a UI screen in accordance with a screen display request from a user.

When there is a screen display request from a user, the control portion acquires a UI template required for display (step S11).

The control portion acquires parameter values of respective parameters in each of UI components constituting the UI screen and decides the contents of display of the UI components successively (step S16) to thereby display the whole page.

In a process of acquiring parameter values, the control portion first acquires meta-information of a parameter from the meta-information table (step S12) and decides a parameter table on the basis of the range of influence designated by the meta-information (step S13).

The control portion then finds the parameter table in the parameter storage portion (step S14) and searches for a table entry of the parameter.

When the table entry is present in the parameter table ("Yes" in step S15), the control portion reads the parameter value from the table entry and decides the contents of display of the UI component.

When the table entry is absent in the parameter table ("No" in step S15), the parameter table to be used is changed to a parameter table closest and wider in the range of influence (step S17) and this routine goes back to step S14 to repeat the process of finding the parameter table in the parameter storage portion and searching for a table entry of the parameter. When, for example, the entry of the parameter in which the range of influence is set to "user" is not found from the parameter table of the user, the control portion refers to a parameter table of the group containing the user. When the entry is still not found, the control portion refers to a parameter table of all users.

When the contents of display are decided on the basis of the parameter table acquired as described above, a UI screen can be displayed.

Although the invention has been described in detail with reference to a specific embodiment, the invention has been disclosed by way of example.

What is claimed is:

1. An information processing apparatus that configures an operation screen formed by one or more user interface components which are displayed based on at least one or more parameter values, which define the user interface components, the apparatus comprising:
    a meta-information storage that is accessed by a processor and stores meta-information corresponding to each parameter comprising a first variable specifying a privileged entity, which has the privilege to change a parameter value for one or more user interface components, and a second variable indicating which entities are affected by the changes made to the parameter value for one or more user interface components;
    a parameter storage that stores a parameter value set by an entity;
    a parameter change section that changes the parameter value stored in the parameter storage in accordance with a request from the privileged entity; and
    an operation screen configuration section that configures the operation screen to display by specifying the entities affected by the changes to the parameter value based on the second variable of the meta-information of each parameter contained in the user interface component and acquiring from the parameter storage the parameter value for each parameter contained in the user interface component.

2. The information processing apparatus according to claim 1, further comprising:
    a meta-information change section that changes the setting of the meta-information stored in the meta-information storage.

3. The information processing apparatus according to claim 1, wherein the second variable is set for a user, a group, or all users.

4. An information processing method that configures an operation screen formed by one or more user interface which are displayed based on at least one or more parameter values, which define the user interface components, the method comprises:
    storing meta-information corresponding to each parameter comprising a first variable specifying a privileged entity, which has the privilege to change a parameter value for one or more user interface components, and a second variable indicating which entities are affected by the changes made to the parameter value for one or more user interface components;
    storing a parameter value set by an entity;
    changing the stored parameter value in accordance with a request from the privileged entity; and
    configuring the operation screen to display by specifying the entities affected by the changes to the parameter value based on the second variable of the meta-information of each parameter contained in the user interface component and acquiring the stored parameter value for each parameter contained in the user interface component.

5. The information processing method according to claim 4, further comprising:
    changing a setting of the stored meta-information.

6. The information processing method according to claim 4, wherein the second variable is set for a user, a group, or all users.

7. A computer readable medium storing a program causing a computer to execute a process for configuring an operation screen formed by one or more user interface components which are displayed based on at least one or more parameter values, which define the user interface components, the process comprising:

storing meta-information corresponding to each parameter comprising a first variable specifying a privileged entity, which has the privilege to change a parameter value for one or more user interface components, and a second variable indicating which entities are affected by the changes made to the parameter value for one or more user interface components;

storing a parameter value set by an entity;

changing the stored parameter value in accordance with a request from the privileged entity; and configuring the operation screen to display by specifying the entities affected by the changes to the parameter value based on the second variable of the meta-information of each parameter contained in the user interface component and acquiring the stored parameter value for each parameter contained in the user interface component.

8. The computer readable medium according to claim 7, the process further comprising:

changing a setting of the stored meta-information.

9. The computer readable medium according to claim 7, wherein the influence range is set for per a user, a group, or all users.

10. The computer readable medium according to claim 8, wherein the changing of the meta-information allows an administrator of the system to change meta-information.

11. The computer readable medium according to claim 7, wherein the changing of the parameter value accepts change of a parameter value from a user given the privilege to change in the meta-information.

12. The computer readable medium according to claim 7, wherein the changing of the parameter value provides a section to change a parameter value to which a privilege to change is given in the meta-information, to a user requesting change of the parameter value.

13. A computer readable medium according to claim 7, wherein the storing of the parameter value stores parameter values in reference tables in accordance with the second variable;

the changing of the parameter stores a parameter value to be changed in a first reference table in terms of the second variable; and the configuring of the screen reads the parameter value of each parameter from the first reference table in the influence range designated by the meta-information, and decides the format of display of user interface components when a screen to be presented to a user is configured.

14. A computer readable medium according to claim 7, wherein the storing of the parameter stores parameter values with the second variable set to all users in a second reference table, stores parameter values with the second variable limited to users in a specific group in a third reference table, and stores the contents of parameter values changed by a user per se in a fourth reference table;

the changing of the parameter stores a parameter value with the second variable set to all users in the second reference table, stores a parameter value with the second variable set to users in the group in the third reference table, and stores a parameter value with the second variable set to the user per se in the fourth reference table of the user, when there is a request to change a parameter; and the configuring of the screen decides a method of displaying user interface components by using the parameter value read from the second reference table with respect to the parameter with the second variable set to all users, uses the parameter value read from the third reference table of the group containing the user with respect to the parameter with the second variable set to the group, and uses the parameter value read from the fourth reference table of the user per se with respect to the parameter with the second variable set to the user, when the operation screen is configured.

15. The information processing apparatus according to claim 1, wherein the first variable is set for a user, a group, or all users.

16. The information processing method according to claim 4, wherein the first variable is set for a user, a group, or all users.

17. The information processing apparatus according to claim 15, wherein the first variable is set for a group or a group administrator.

* * * * *